United States Patent [19]
Johnson

[11] Patent Number: 5,222,748
[45] Date of Patent: Jun. 29, 1993

[54] BEACH TOTE-SLED ASSEMBLAGE KIT

[76] Inventor: Leigh Johnson, 85 Apple Tree Row, Berkeley Heights, N.J. 07922

[21] Appl. No.: 782,119

[22] Filed: Oct. 25, 1991

[51] Int. Cl.⁵ .............................................. B62B 13/18
[52] U.S. Cl. ...................................... 280/8; 280/19.1; 280/47.34
[58] Field of Search .................... 280/7.12, 7.13, 7.14, 280/8, 9, 10, 11, 28.17, 19.1, 15, 79.2, 24, 79.3, 655, 651, 79.11, 79.2, 47.34, 47.35, 47.36, 47.371, 47.38, 47.41

[56] References Cited

U.S. PATENT DOCUMENTS

| | | | |
|---|---|---|---|
| 352,450 | 11/1888 | Crane | 280/9 |
| 883,258 | 3/1908 | Tolle | 280/9 |
| 1,154,370 | 9/1915 | Burke | 280/9 |
| 1,270,782 | 7/1918 | Carr et al. | 280/19.1 |
| 1,331,501 | 2/1920 | Heger | 280/9 |
| 1,404,990 | 1/1922 | Martin | 280/9 |
| 1,422,041 | 7/1922 | Dinning et al. | 280/9 |
| 2,106,530 | 1/1938 | Kelly | 280/9 |
| 2,737,397 | 3/1956 | Turner | 280/19.1 |
| 3,219,357 | 11/1965 | Cheatham | 280/8 |
| 3,429,582 | 2/1969 | Embry | 280/9 |
| 3,463,502 | 8/1969 | Gough | 280/8 |
| 4,291,891 | 9/1981 | Blanchette | 280/9 |
| 4,863,075 | 9/1989 | Romer | 280/8 |

Primary Examiner—Richard M. Camby
Attorney, Agent, or Firm—William T. Hough

[57] ABSTRACT

A wheeled beach sled kit of separate parts adapted for intermittent assemblage and disasemblage thereof into a sled for pulling paraphanelia alternately on sand and pavements including spaced-apart tubular sled-runners rigidly interconnected by forward and rearward axles each mounting spaced-apart wheels that extend below the bottoms of the sled runners, and a pair of rails uprightly mountable in mounting sled runner holes continuous of the tubular sled runners at opposite ends of each sled runner of the paired sled runners, the pair of rails being spaced-apart and having spaced apart horizontal rail-portions when uprightly mounted, a flexible material formed into an open-top contained suspended downwardly from and between the spaced apart horizontal rail-portions, and shade structure including a pair of spaced apart supports mounted on the pair of rails, with a shade-producing fabric mounted on and extending between the shade structures.

18 Claims, 3 Drawing Sheets

BEACH TOTE-SLED ASSEMBLAGE KIT

This invention is directed to a portable kit which can be assembled into a paraphanelia-carrying sled-wagon combination, as a tote sled assembly.

PRIOR ART

A recent patentability search having been conducted in U.S. Class 280, subclasses 9,10 and 13, while no relevant prior art was located, art of interest includes: Blanchette U.S. Pat. No. 4,291,891 granted Sep. 29, 1981 to a pulling handled-sled of unified permanent rigid structure inclusive of retractable wheels with permanent upright side and back rail extending upwardly from a conventional flat hard slated platform; and Tolle U.S. Pat. No. 883,258 granted Mar. 31, 1908 also to a sled having retractable wheels. Likewise Embry U.S. Pat. No. 3,429,582 granted Feb. 25, 1969 is to a rigid platform sled having alternately retractable wheels and runners, the horizontal platform being a fabric horizontally extending between spaced-apart rigid runner-supports. Likewise Kelly U.S. Pat. No. 2,106,530 granted Jan. 25, 1938 is to a rigid platform sled having four retractable wheels. Likewise Dinning et al. U.S. Pat. No. 1,422,041 is to a rigid platform sled having four retractable wheels. Burke U.S. Pat. No. 1,154,370 likewise is to a rigid four-wheel platform-sled having spaced apart forward and rearward retractable axles.

BACKGROUND OF THE INVENTION

Prior to the present invention, young mothers transporting themselves and their small children and/or babies to the sands of the sea side beaches have been physically burdened with the laborious and exhausting task of manually lifting and carrying in their hands and arms massive quantities of miscellaneous paraphanelia. The paraphanelia includes blankets, food containers, shade producing tents and/or stands, beach chairs, beverage containers, lotion bottles, sun-shielding umbrellas, baby-carriers, other miscellaneous items, and often small children and/or babies. The entire task is repeated when leaving the beach, each of the arrival and the departure requiring repeated trips between the automobile or van and the beach or alternately the involvement of several people sharing in the strenuous task. Moreover, usually the car (automobile), apart from the adult and children occupants, is totally filled and overflowing with kids, leaving no room for space-taking carts or wagons or the like.

THE OBJECTS

The present objects are directed to the overcoming and avoiding of the problems and difficulties of the foregoing types normally an integral part of the so-called joy of going to the beach.

More particularly, an object of the invention is to obtain a kit that is adapted to be intermittently assembled into a light-weight sled.

Another object is to obtain such a kit that can be assembled and disassembled by a person having little mechanical skills or abilities.

Another object is to obtain a kit above-noted that may be compactly and/or flatly transported in an automobile devoid of occupying excessive volumes of space within a car (automobile) or like.

Another object is to obtain such kit that when assembled may optionally include a shade producing canopy or umbrella-structure.

Another object is to obtain such a kit above-noted of which the assembled sled has permanently rigidly non-retractable wheels affording sled use equally well across sand and hard-surface such as concrete or the like.

Another object is for such a kit when assembled to provide an open-top container having upright sides that prevent paraphanelia from tumbling or otherwise falling from the sled.

Another object is to obtain a kit which when assembled may serve an alternate purpose of craddling a small child or baby, and/or providing a shading structure or playpen.

Another object is to obtain such a kit which when assembled includes a curtain of soft and/or flexible material or fabric adapted for folding and or wrapping around the mounting structure during transporting and-/or storage thereof.

Another object is to obtain such a kit which when assembled has sufficiently large dimensions as to provide ample room for concurrent transport of massive quantities of paraphanelia.

Another object is to obtain such a kit which when assembled does not require switching from wheels to sled runners only, nor from sled-runners to wheels-only, thereby to obviate extra parts and the necessity of a person having to shift from one to the other when going from hard-surface to sand, or from sand to hard-surface, and to obviate need for mechanical skill and/or to unload or manipulate by avoiding need for shifting back and forth from sled-runners only to wheels only, or visa-versa.

Other objects become apparent from the proceeding and following disclosure.

BROAD INVENTION

Broadly the invention may be described as a beach sled assembly kit. The kit in its broadest context includes several basic elements as a combination of inter-related elements, broadly identified as a first pair of spaced-apart runners, a second pair of forward and rearward rigid connectors, a third pair of uprightly-mountable rails, and a container structure and mechanism thereof.

More particularly, the first pair of spaced-apart sled runners each are of tubular construction and each have at least a forward end upwardly turned arcuate shape, and each of the first pair has a rearward end. The tubular construction forms tubular space.

The second pair of forward and rearward rigid connectors have the forward connectors rigidly secured in a non-shiftable state to and inter-connecting the forward ends of the first pair, and the rearward connector rigidly secured to and inter-connecting the rearward ends of the first pair.

The third pair of uprightly-mountable rails, each have upper and lower portions. Each of the forward and rearward ends of the first spaced apart-pair at their respective forward and rearward ends, includes ends-mounting structure and mechanism thereof for intermittently mounting the third pair in upright positions on said the first pair of spaced apart sled runners;

The container structure and mechanism thereof has a support surface and open space thereabove, located and positioned to support—as a conveyance—one or more of article(s) and/or person(s). The container structure and mechanism thereof are mounted on each of and extending between the upper portions of the uprightly mountable rails.

As a first preferred embodiment as an improvement on the above-described broad invention, the second pair of forward and rearward rigid connectors are forward and rearward axles each having spaced-apart revolvavble wheels rigidly mounted in a fixed state on the spaced apart wheel-mounting opposite ends. The spaced apart opposite ends are positioned, and the wheels each have an outer wheel-surface circumference sufficiently large such that the outer wheel-surface circumference of the wheel extends to a level below the first pair allowing the wheels to be rolled across a hardened surface.

In a second preferred embodiment as an improvement on the above-described first preferred embodiment, there is included a shade-providing structure and mechanism thereof, for shading the above-noted open space above the support surface. The shading-structure mounting structure and mechanism thereof also provides for intermittently detachably mounting the shading structure and its mechanized portions, onto one or more of the third pair of uprightly mountable rails and of the first pair of the spaced apart sled runners.

In a third preferred embodiment as an improvement on the above-described second embodiment, the container structure and mechanism thereof include flexible material having opposite ends mounted on and between said upper portions. The flexible material has a central support portion suspended below and between the upper and lower portions when the third pair is mounted on the first pair.

In a fourth preferred embodiment as an improvement on the second preferred embodiment, the central support portion has opposite-edges. In this fourth preferred embodiment there is additionally included uprightly positioned retainer structure mounted on the support surface in position along the opposite-edges.

In a fifth preferred embodiment as an improvement on the fourth preferred embodiment, the tubular construction of each runner has a horizontal width as tubular outer diameter width of at least about two inches.

In a sixth preferred embodiment as an improvement on the fifth preferred embodiment, the tubular construction of each sled runner has a horizontal width as tubular outer diameter width of at least about three inches.

In a seventh preferred embodiment as an improvement on the sixth preferred embodiment, the tubular construction includes a bottom concave face.

In an eighth preferred embodiment as an improvement of the above-described broad invention, there is included a shading structure and mechanism thereof for shading the open space above the support surface. The shading-structure mounting structure and mechanism thereof additionally provides for intermittently detachably mounting the shading means onto one or more of the third pair of uprightly mountable rails and the first pair of spaced apart sled runners.

In a nineth preferred embodiment as an improvement on the above-described broad invention, the container structure and mechanism thereof includes flexible material having opposite ends mounted on and between the upper and lower portions when the third pair is mounted on the first pair.

In a tenth preferred embodiment as an improvement on the above-described invention, the tubular construction of each runner has a horizontal width as tubular outer diameter width of at least about two inches.

In an eleventh preferred embodiment as an improvement on the tenth preferred embodiment, the tubular construction of each sled runner has a horizontal width as tubular outer diameter width of at least about three inches.

In a twelfth preferred embodiment as an improvement on the above-described broad invention, the tubular construction includes a bottom concave face.

In a thirteenth preferred embodiment as an improvement on the above-described broad invention, the forward and rearward connectors are secured in a non shiftable state to the first pair of spaced apart sled-runners.

In a fourteenth preferred embodiment as an improvement on the first preferred embodiment, the spaced apart wheels each are revolveable wheels fixedly mounted in a non-shifting state always having the outer wheel-surface circumference extending to a level below the first pair of spaced apart sled-runners.

In a fifteenth preferred embodiment as an improvement on the above-described broad invention, the first pair of spaced apart sled runners consists essentially of plastic.

In a sixteenth preferred embodiment as an improvement on the twelfth preferred embodiment, the plastic includes polypropylene.

In a seventeenth preferred embodiment as an improvement on the above-described broad invention, the first pair of spaced apart sled runners each range from about four feet up to about six feet.

In an eighteenth preferred embodiment as an improvement on the broad invention, the first pair of spaced apart sled runners has an outer circumference as a width thereof, ranging from about three inches to about six includes.

The invention may be better understood by making reference to the following Figures.

THE FIGURES

FIG. 1 diagrammatically illustrates a first embodiment shown in front side and top perspective view.

FIG. 2 diagrammatically illustrates with partial cutaway a cross-sectional view of the first embodiment as it would appear when resting on a hard surface.

FIG. 2A diagrammatically illustrates a cross sectional view of the first embodiment as it would appear when resting or being pulled on sand, also as taken along lines 2 of FIG. 1.

FIG. 3 diagrammatically illustrates a second embodiment in a front, side and top perspective view; this embodiment has the same wheel and structural arrangement a illustrated in FIG. 2 of the first embodiment.

FIG. 4 as a variation on each of the first and second embodiments, illustrates diagrammatically an in part view a cross sectional view at the same position as FIG. 2, on resting on a hard overface, illustrating an alternate axle and wheel arrangement for each of the first and second embodiments.

DETAILED DESCRIPTION

In the figures, the same indicia are utilized for same element in different figures of a same embodiment, and related indicia are utilized for elements of the same function for different embodiments. Once an element for an element or one of related function has been described, description is not repeated for other figures, except in certain instances to improve clarity or understanding.

Figure 1:
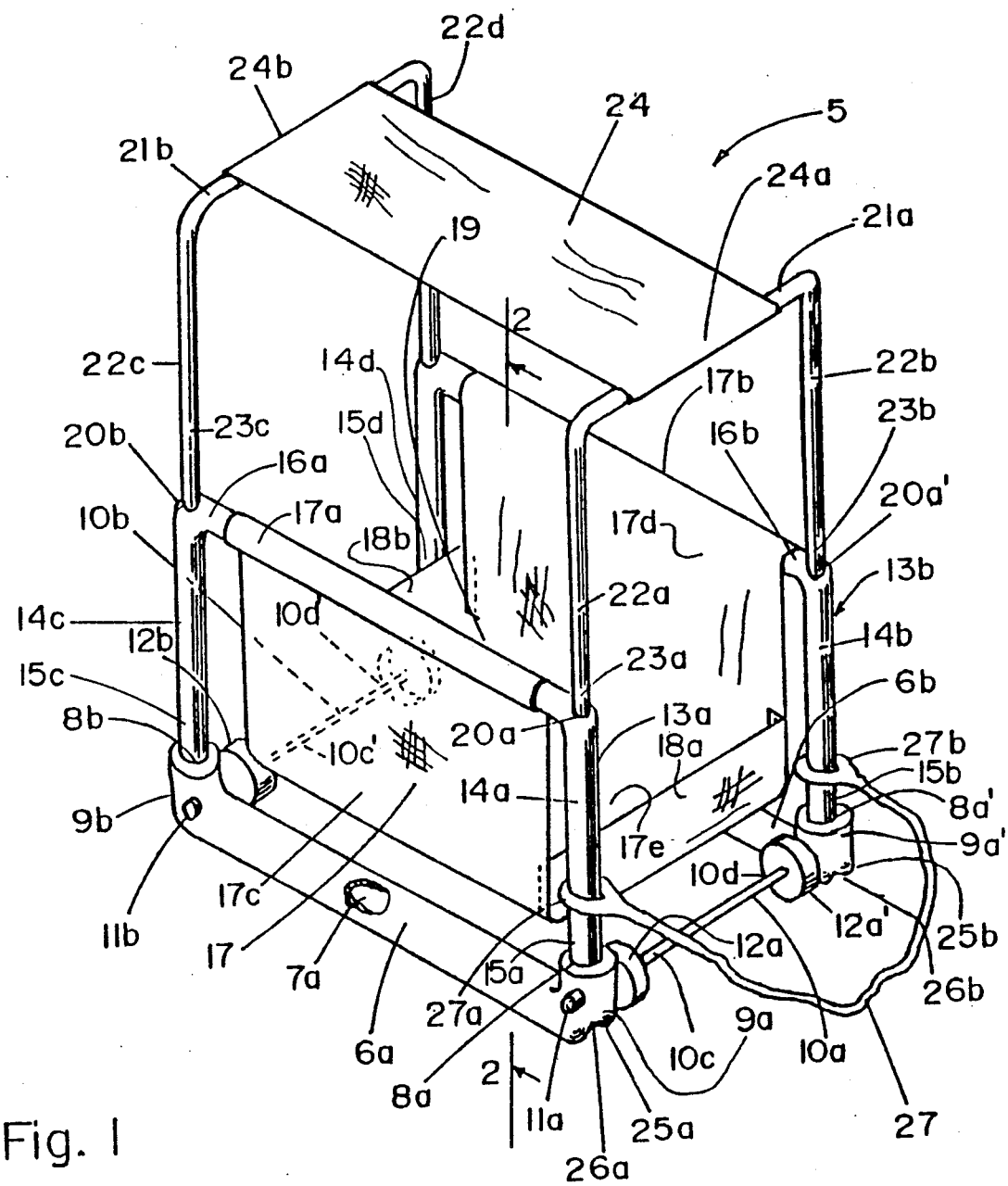
Figure 2:
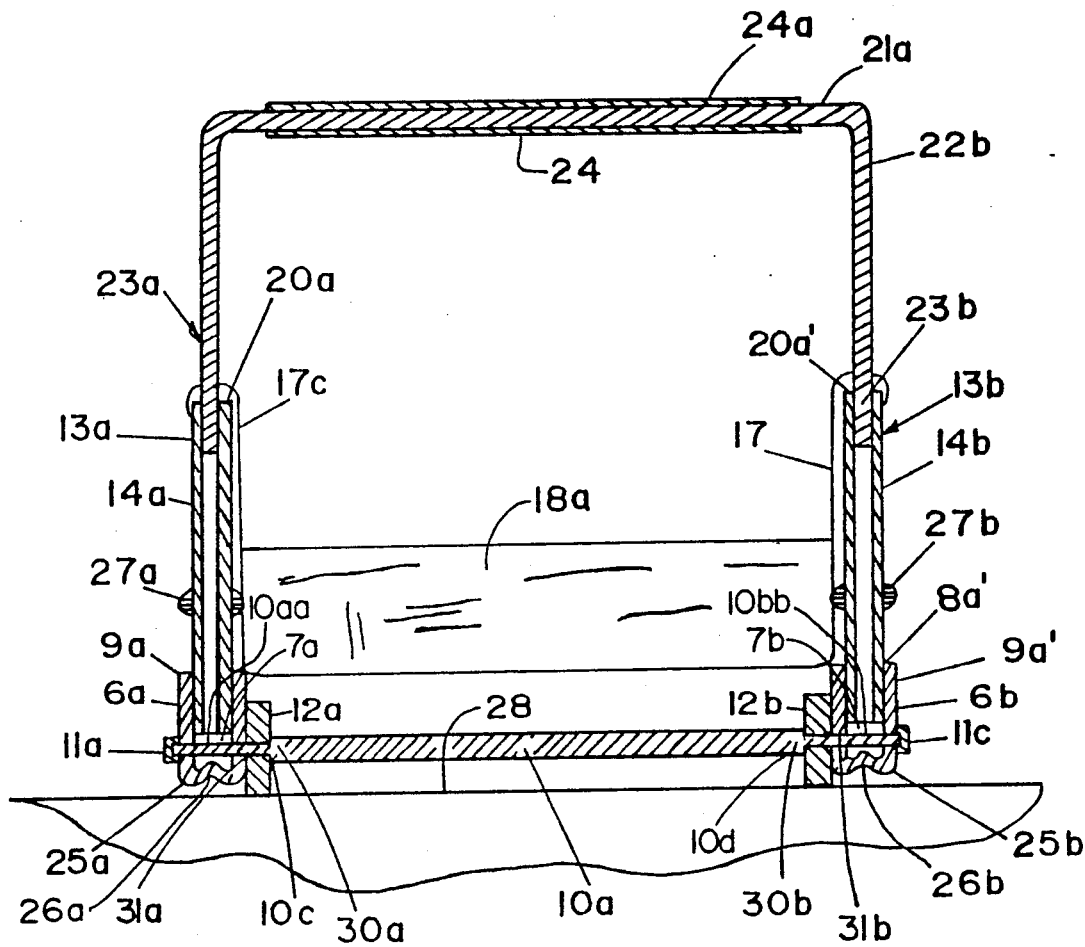
Figure 2A:
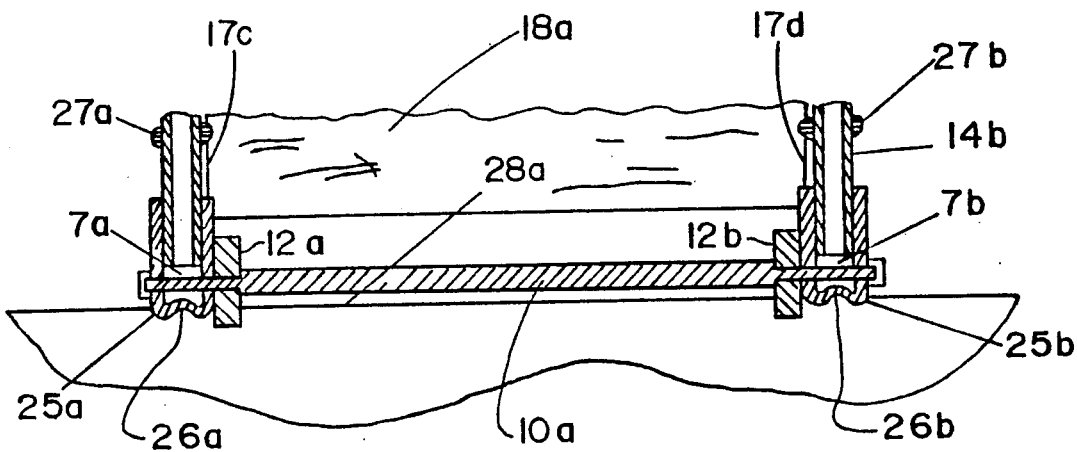

FIGS. 1, 2 and 2A diagrammatically illustrate the same first embodiment, FIG. 1 in perspective front and top and side views, FIG. 2 cross-sectional view taken along line 2—2 of FIG. 1, and FIG. 2A in an in-part view comparable to that of FIG. 2A.

Figure 3:
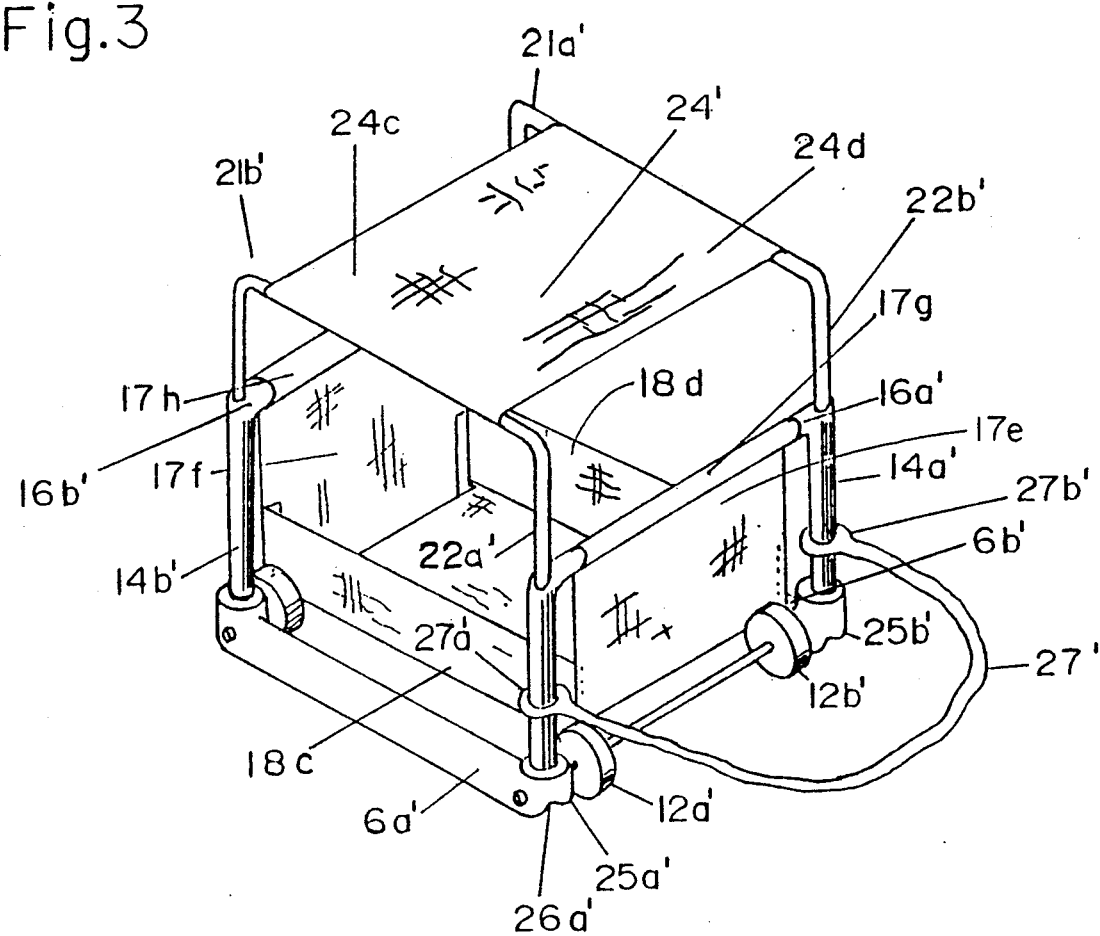

FIG. 3 diagrammatically illustrates an alternate second embodiment in also a front and top and side perspective view.

Figure 4:
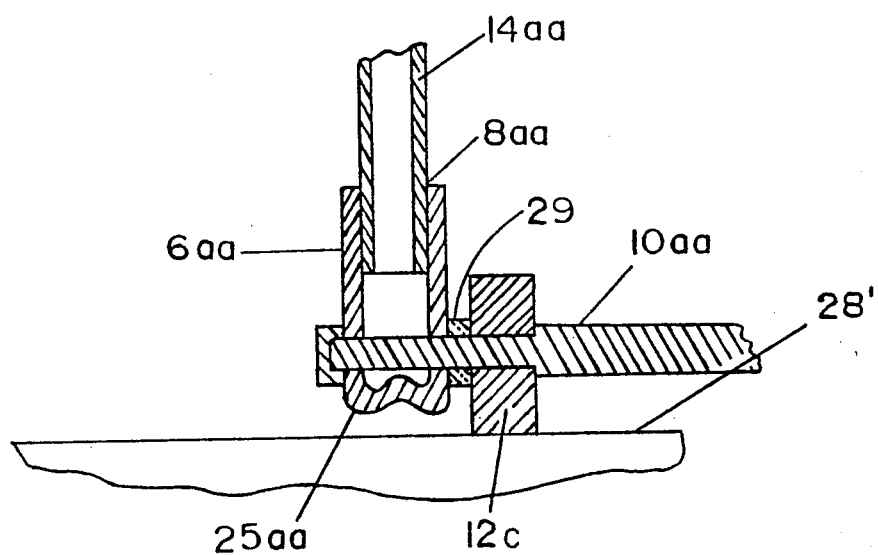

FIG. 4 diagrammatically illustrates an alternate third and fourth embodiment on variation on each of the first and second embodiments, in an in-part view in cross-section, analogous to the views of FIGS. 2 and 2A.

FIG. 1 diagrammatically illustrates a wheeled beach sled kit 5 in an assembled state, having each of two spaced apart tubular sled runners 6a and 6b forming through-spaced 7 with arcuate forward and rearward ends 9a, 9a' and 9b, 9b' (7b' not visible) having through spaced forward and rearward upwardly-extending parts 8a', 8b and 8b' (not visible). The tubular sled-runners 6a and 6b are permanently attached and fastened together at each of opposite forward and rearward ends 9a, 9a', 9b, 9b' by identical outer-wedge-capo 11a, 11b and 11a' (not visible). Forward wheels 12a and 12a' are mounted on opposite ends forward opposite ends 10c and 10c' of axle 10a and rearward opposite ends (shown in phantom) 10c' and 10d'.

A pair of spaced-apart tubular members 13a and 13b are each u-shaped having downwardly-extending identical legs 14a, 14b and 14c, 14d having lower ends 15a, 15b and 15c, 15d. Leg 14a is slidably detachably mounted within upwardly-extending port 8a'. Likewise leg 14a is slidably detachably mounted within upwardly-extending port 8a'. Likewise leg 14b is slidably detachably mounted within upwardly extending port 8a'. Likewise leg 14c is slidably detachably mounted within upwardly-extending port 8b and leg 14d is slidably detachably mounted within upwardly-extending port 8b' and leg 14d is slidably detachably mounted within upwardly-extending port 8b' (not viewable). Rail members 13a and 13b respectively have horizontally extending bards 16a and 16b respectively mounting opposite ends 17a and 17b of downwardly-suspended flexible material 17 having downwardly extending pannels 17c, and 17d and horizontal bottom pannel 17e and end panels 18a and 18b interconnecting with opposite downwardly extending panels 17c and 17d to form receptacle or container space 19. The tubular rail members 13a and 13b have identical upwardly-facing parts 20a and 20b and 20a' and 20b' (not viewable). U-shaped canopy-supporting rail members 21a and 21b have downwardly extending legs 22a and 22b and 22a' and 22b' respectively having leg-ends 23a and 23b and 23a' and 23b' that are slidably and detachably (withdrawably) mounted in the parts 20a, 20b, 20a' and 20b'. The U-shaped canopy-support rail members 21a and 21b have horizontally-exfending mid-rails 21c and 21d mounting opposite ends 24a and 24b of canopy 24. The sled-runners 6a and 6b each have bottom surfaces 25a and 25b having a substantially-extending concavely-shaped arcuate recess 26a and 26b adapted to trap or press downwardly onto sand of a sandy surface 28a. There in a pull cord 27 anchored that attachment ends 27a and 27b onto the downwardly-extending legs 14a and 14b. When on hard surface 28(FIG. 2), wheels 12a–24d support the entire structure and roll on such hard surface.

FIG. 2. In primarily cross-section along line-2 of FIG. 1, in part view illustrates the same elements as FIG. 2, additionally having the sled runners bottom surfaces 25a and 25b and concave indented surfaces 26a 26b resting on and in contact with sandy surface 28a. As compared to the embodiment of FIGS. 2 and 2A the FIG. 4 embodiment includes loose fitting washer members 29 making the wheels such as wheel 12c revolve more easily devoid of frictional drag thereof against the tubular runner 6aa, in rolling on hard surface 27. In the embodiments of FIGS. 1, 2, 1A, 3 and 4, the wheels 12a–12d all are positioned to sink only slightly into a sandy surface 28a. The wheel lower surface being only a minor dimension below the bottom surfaces 25a and 25b. FIG. 2 axles such as axle 10a have opposite axle portions such as 30a and 30b of larger cross-section than smaller wheel through-spaces such as 31a and 31b whereby the axle portions 30a and 30b rigidly press against the revolvable wheels such as wheels 12a and 12b.

FIG. 3 represents a variation in manner of assemblage of the above described kit parts and/or elements.

It is within the scope of the invention to make such variations and modifications and substitutions within the scope of the invention.

I claim:

1. A beach sled assembly kit consisting essentially of, in combination:

(a) beach sled runner means for sliding on top of sand, said beach sled runner means consisting essentially of a first pair of spaced-apart sled runners each of tubular construction and each having an outer circumference of predetermined sufficiently large outer circumference as to slide substantially on top of and as to avoid sinking significantly into sand, and each having at-least a first forward end upwardly turned arcuate shape, each of said first pair having a first rearward end, and said tubular construction forming tubular space;

(b) a second pair of uprightly-mountable rails, each of said second pair having spaced-apart second forward and rearward ends, each of the second pair having upper and lower spaced-apart portions, and each of the seocnd pair having an intermediate horizontal portion extending between and continuous with the spaced-apart upper portions;

(c) a third pair of forward and rearward rigid connectors. the forward connector being rigidly secured in a non-shiftable state to and inter-connecting at-least one of said first forward ends and said second forward ends, and the rearward connector being rigidly secured to and inter-connecting at-least one of said second rearward ends;

(d) each of said forward and rearward ends of said first spaced-apart pair having mounting means for intermittently mounting said third pair in upright positions on said first pair of spaced apart sled runners, with the horizontal portion of a first one of said third pair extending substantially parallel with a remaining one of said third pair when said lower portions are mounted by said mounting means of said pair of spaced-apart sled runners; and (e) container means having a support surface and open space thereabove, for support and conveyance of at least one of an article and a person, said container means having a fourth pair of spaced-apart structures continuous with an interconnecting support structure having an upper surface positioned substantially horizontally and adapted to support an object on the upper surface, one of the fourth pair being mounted on one of the horizontal portions of said third pair and with a remaining one of the fourth pair mounted on a remaining one of the horizontal portions of said third pair, the fourth pair having the interconnecting support structure extending substantially horizontally between said fourth pair and the interconnecting support structure being spaced-above said beach sled runner means, said second pair of forward and rearward rigid connectors being forward and rearward axles each having spaced-apart revolvable wheels rigidly mounted in a fixed state on said spaced apart wheel-mounting opposite ends, said spaced apart opposite ends being positioned and said wheels each having an outer wheel-surface circumference sufficiently large such that said outer wheel-surface circumference of the wheel extends to a predetermined level below said first pair such that the wheels may be rolled across a hardened surface with the first pair supported above the hardened surface.

2. A beach sled assembly kit consisitgn essentially of, in combination:
 (a) beach sled runner means for sliding on top of sand, said beach sled runner means consisting essentially of a first pair of spaced-apart sled runners each of tubular construction and each having an outer circumference of predetermined sufficiently large outer circumference as to slide substantially on top of and as to avoid sinking significantly into sand, and each having at-least a first forward end upwardly turned arcuate shape, each of said first pair having a first rearward end, and said tubular construction forming tubular space;
 (b) a second pair of uprightly-mountable rails, each of said second pair having spaced-apart second forward and rearward ends, each of the second pair having upper and lower spaced-apart portions, and each of the seocnd pair having an intermediate horizontal portion extending between and continuous with the spaced-apart upper portions;
 (c) a third pair of forward and rearward rigid connectors, the forward connector being rigidly secured in a non-shiftable state to and inter-connècting at-least one of said first forward ends and said second forward ends, and the rearward connector being rigidly secured to and inter-connecting at-least one of said second rearward ends;
 (d) each of said forward and rearward ends of said first spaced-apart pair having mounting means for intermittently mounting said third pair in upright positions on said first pair of spaced apart sled runners, with the horizontal portion of a first one of said third pair extending substantially parallel with a remaining one of said third pair when said lower portions are mounted by said mounting means of said pair of spaced-apart sled runners; and
 (e) container means having a support surface and open space thereabove, for support and conveyance of at least one of an article and a person, said container means having a fourth pair of spaced-apart structures continuous with an interconnecting support structure having an upper surface positioned substantially horizontally and adapted to support an object on the upper surface, one of the fourth pair being mounted on one of the horizontal portions of said third pair and with a remaining one of the fourth pair mounted on a remaining one of the horizontal portions of said third pair, the fourth pair having the interconnecting support structure extending substantially horizontally between said fourth pair and the interconnecting support structure being spaced-above said beach sled runner means, said second pair of forward and rearward rigid connectors being forward and rearward axles each having spaced-apart revolvable wheels rigidly mounted in a fixed state on said spaced apart wheel-mounting opposite ends, said spaced apart opposite ends being positioned and said wheels each having an outer wheel-surface circumference sufficiently large such that said outer wheel-surface circumference of the wheel extends to a predetermined level below said first pair such that the wheels may be rolled across a hardened surface with the first pair supported above the hardened surface, and shading-structure mounting means for intermittently detachably mounting said shading-structure means onto at least one of said third pair of uprightly mountable rails and said first pair of spaced apart sled runners.

3. A beach sled assembly kit consisting essentially of, in combination:
 (a) beach sled runner means for sliding on top of sand, said beach sled runner means consisting essentially of a first pair of spaced-apart sled runners each of tubular construction and each having an outer circumference of predetermined sufficiently large outer circumference as to slide substantially on top of and as to avoid sinking significantly into sand, and each having at-least a first forward end upwardly turned arcuate shape, each of said first pair having a first rearward end, and said tubular construction forming tubular space;
 (b) a second pair of uprightly-mountable rails, each of said second pair having spaced-apart second forward and rearward ends, each of the second pair having upper and lower spaced-apart portions, and each of the seocnd pair having an intermediate horizontal portion extending between and continuous with the spaced-apart upper portions;
 (c) a third pair of forward and rearward rigid connectors, the forward connector being rigidly secured in a non-shiftable state to and inter-connecting at-least one of said first forward ends and said second forward ends, and the rearward connector being rigidly secured to and inter-connecting at-least one of said second rearward ends;
 (d) each of said forward and rearward ends of said first spaced-apart pair having mounting means for intermittently mounting said third pair in upright positions on said first pair of spaced apart sled runners, with the horizontal portion of a first one of said third pair extending substantially parallel with a remaining one of said third pair when said lower portions are mounted by said mounting means of said pair of spaced-apart sled runners; and
 (e) container means having a support surface and open space thereabove, for support and conveyance of at least one of an article and a person, said container means having a fourth pair of spaced-apart structures continuous with an interconnecting support structure having an upper surface positioned substantially horizontally and adapted to support an object on the upper surface, one of the fourth pair being mounted on one of the horizontal portions of said third pair and with a remaining one of the fourth pair mounted on a remaining one of the horizontal portions of said third pair, the fourth pair having the interconnecting support structure extending substantially horizontally between said fourth pair and the interconnecting support structure being spaced-above said beach sled runner means, said second pair of forward and rearward rigid connectors being forward and rearward axles each having spaced-apart revolvable wheels rigidly mounted in a fixed state on said spaced apart wheel-mounting opposite ends, said spaced apart opposite ends being positioned and said wheels each having an outer wheel-surface circumference sufficiently large such that said outer wheel-surface circumference of the wheel extends to a predetermined level below said first pair such that the wheels may be rolled across a hardened surface with the first pair supported above the hardened surface, and shading-structure mounting means for intermittently detachably mounting said shading-structure means onto at least one of said third pair of uprightly mountable rails and said first pair of spaced apart sled runners, said container means including flexible material having opposite ends mounted on and between said upper portions and said flexible material having a central support portion suspended below and between said upper and lower portions when said third pair is mounted on said first pair.

4. The beach tote-sled assemblage-kit of claim 2, in which said central support portion has opposite-edges, and including uprightly positioned retainer structure mounted on said support surface in position along said opposite-edges.

5. The beach tote-sled assemblage-kit of claim 4, in which said tubular construction of each runner has a horizontal width as tubular outer diameter width of at least about two includes.

6. The beach tote-sled assemblage-kit of claim 5, in which said tubular construction of each sled runner has a horizontal width as tubular outer diameter of at least about three inches.

7. The beach tote-sled assemblage-kit of claim 6, in which said tubular construction includes a bottom concave face.

8. The beach tote-sled assemblage-kit of claim 3, including a shading means fort shading said open space above said support surface, and shading-structure mounting means for intermittently detachably mounting said shading-structure means onto at least one of said third pair of uprightly mountable rails and said first pair of spaced apart sled runners.

9. The beach tote-sled assemblage-kit of claim 3, in which said tubular construction of each runner has a horizontal width as tubular outer diameter width of at least about two includes.

10. The beach tote-sled assemblage kit of claim 3, in which said tubular construction of each runner has a horizontal width as tubular outer diameter width of at least about two inches.

11. The beach tote-sled assemblage kit of claim 10, in which said tubular construction of each sled runner has a horizontal width as tubular outer diameter of at least about three inchdes.

12. The beach tote-sled assemblage-kit of claim 3, in which said tubular construction includes a bottom concave face.

13. The beach tote sled assemblage-kit of claim 3, in which the forward and rearward connectors are secured in a non-shiftable state to said first pair of spaced apart sled-runners.

14. The beach tote-sled assemblage-kit of claim 1, in which said spaced apart wheels each being revolveable wheels fixedly mounted in a non-shifting state always having said outer wheel-surface circumference extending to a level below said first pair of spaced apart sled-runners.

15. The beach tote-sled assemblage-kit of claim 3, in which said first pair of spaced apart sled runners consists essentially of plastic.

16. The beach tote-sled assemblage kit of claim 15, in which said plastic includes polypropylene.

17. The beach tote-sled assemblage-kit of claim 3, in which said first pair of spaced apart sled runners each range from about four feet up to about six feet.

18. The beach tote-sled assemblage-kit of claim 3, in which said first pair of spaced apart sled runners has an outer circumference as a width thereof, ranging from about three inches to about six inches.

* * * * *